US012150143B2

(12) United States Patent
Sun et al.

(10) Patent No.: US 12,150,143 B2
(45) Date of Patent: Nov. 19, 2024

(54) RECEIVING CHANNEL STATE INFORMATION FROM A UE FOR MULTI-TRP OPERATION

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Huaning Niu, San Jose, CA (US); Ismael Gutierrez Gonzalez, San Jose, CA (US); Jia Tang, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 17/593,502

(22) PCT Filed: Oct. 2, 2020

(86) PCT No.: PCT/CN2020/119793
§ 371 (c)(1),
(2) Date: Sep. 20, 2021

(87) PCT Pub. No.: WO2022/067859
PCT Pub. Date: Apr. 7, 2022

(65) Prior Publication Data
US 2022/0312392 A1 Sep. 29, 2022

(51) Int. Cl.
*H04W 72/23* (2023.01)
*H04B 7/06* (2006.01)
(Continued)

(52) U.S. Cl.
CPC .......... *H04W 72/23* (2023.01); *H04B 7/0617* (2013.01); *H04B 7/0626* (2013.01);
(Continued)

(58) Field of Classification Search
CPC ..... H04W 72/23; H04W 24/02; H04W 24/10; H04W 64/00; H04B 7/0617;
(Continued)

(56) References Cited

U.S. PATENT DOCUMENTS 11,838,151 B1 12/2023 Jones et al.
2019/0207667 A1 7/2019 Zhou et al.
(Continued)

FOREIGN PATENT DOCUMENTS

CN 109479204 3/2019
CN 110168995 8/2019
(Continued)

OTHER PUBLICATIONS

Spreadtrum Communications, "Discussion on CSI enhancement for multiple TRP/Panel transmission"; 3GPP TSG RAN WG1#102-e; R1-2006262; Aug. 28, 2020; 4 sheets.
(Continued)

*Primary Examiner* — Ashley Shivers
(74) *Attorney, Agent, or Firm* — Fay Kaplun & Marcin, LLP

(57) ABSTRACT

A cell receives channel state information for multiple transmission reception points (TRPs) from a user equipment (UE). The cell selects a first transmission reception point (TRP) of multiple TRPs associated with a cell of a network, transmits a signal to a user equipment (UE) via the selected TRP, wherein the signal is configured to trigger semi-persistent CSI (SP-CSI) report at the UE and receives the SP-CSI report from the UE that includes CSI corresponding to each TRP of the multiple TRPs.

19 Claims, 6 Drawing Sheets

(51) Int. Cl.

| | |
|---|---|
| ***H04L 5/00*** | (2006.01) |
| ***H04W 24/02*** | (2009.01) |
| ***H04W 24/10*** | (2009.01) |
| ***H04W 64/00*** | (2009.01) |

(52) U.S. Cl.
CPC .......... *H04L 5/0035* (2013.01); *H04L 5/0048* (2013.01); *H04W 24/02* (2013.01); *H04W 24/10* (2013.01); *H04W 64/00* (2013.01)

(58) Field of Classification Search
CPC ... H04B 7/0626; H04L 5/0035; H04L 5/0048; H04L 5/0057; H04L 5/0023
See application file for complete search history.

(56) References Cited

U.S. PATENT DOCUMENTS

| | | | | |
|---|---|---|---|---|
| 2019/0208436 | A1 | 7/2019 | Zhou et al. | |
| 2019/0215781 | A1* | 7/2019 | Jeon | H04W 52/365 |
| 2019/0215897 | A1* | 7/2019 | Babaei | H04W 76/38 |
| 2019/0230545 | A1 | 7/2019 | Liou et al. | |
| 2019/0364546 | A1 | 11/2019 | Kwak et al. | |
| 2020/0015229 | A1* | 1/2020 | Yang | H04W 76/15 |
| 2020/0022040 | A1* | 1/2020 | Chen | H04W 36/08 |
| 2020/0052759 | A1 | 2/2020 | Zhang et al. | |
| 2020/0067676 | A1 | 2/2020 | Yi | |
| 2020/0280996 | A1 | 9/2020 | Yang et al. | |
| 2020/0351069 | A1 | 11/2020 | Grant et al. | |
| 2020/0404668 | A1 | 12/2020 | Nakamura et al. | |
| 2021/0006314 | A1 | 1/2021 | Takeda et al. | |
| 2021/0028843 | A1* | 1/2021 | Zhou | H04B 7/063 |
| 2021/0044397 | A1* | 2/2021 | Khoshnevisan | H04L 5/0032 |
| 2021/0127387 | A1 | 4/2021 | Huang et al. | |
| 2021/0211893 | A1 | 7/2021 | Shao et al. | |
| 2021/0227513 | A1 | 7/2021 | Takeda et al. | |
| 2021/0360701 | A1* | 11/2021 | Xu | H04L 5/0053 |
| 2022/0014954 | A1 | 1/2022 | Ibrahim et al. | |
| 2022/0046458 | A1* | 2/2022 | Zhu | H04L 5/0048 |
| 2022/0052826 | A1 | 2/2022 | Yang et al. | |
| 2022/0053522 | A1 | 2/2022 | MolavianJazi et al. | |
| 2022/0116947 | A1 | 4/2022 | You et al. | |
| 2022/0131582 | A1 | 4/2022 | Park et al. | |
| 2022/0182913 | A1 | 6/2022 | Liu et al. | |
| 2022/0264433 | A1 | 8/2022 | Xiao et al. | |
| 2022/0287054 | A1 | 9/2022 | Kim et al. | |
| 2022/0386154 | A1* | 12/2022 | Maattanen | H04W 36/06 |
| 2023/0021510 | A1* | 1/2023 | Guo | H04B 17/336 |
| 2023/0060481 | A1* | 3/2023 | Yuan | H04L 5/0048 |
| 2023/0188197 | A1* | 6/2023 | Zhang | H04B 7/0634 370/329 |
| 2023/0208490 | A1 | 6/2023 | Kim et al. | |
| 2023/0254872 | A1 | 8/2023 | Kwak et al. | |
| 2023/0327727 | A1* | 10/2023 | Hindy | H04B 7/024 370/329 |

FOREIGN PATENT DOCUMENTS

| | | |
|---|---|---|
| CN | 110582977 | 12/2019 |
| CN | 110831196 | 2/2020 |
| CN | 110933749 A | 3/2020 |
| CN | 111434067 | 7/2020 |
| EP | 3471315 | 4/2019 |
| WO | 2019/160660 | 8/2018 |
| WO | 2019/136205 | 7/2019 |
| WO | 2020148839 | 7/2020 |

OTHER PUBLICATIONS

Lenovo et al., "Discussion of multi-TRP/Panel transmission"; 3GPP TSG RAN WG1 Meeting #99; R1-1912316; Nov. 22, 2019; 11 sheets.

Zte et al., "On CSI-RS for CSI acquisition", 3GPP TSG RAN WG1 Meeting #88, R1-1701814, Feb. 2, 2017, 5 sheets.

* cited by examiner

| A/D | Serving Cell ID | BWP ID | | | | | |
|---|---|---|---|---|---|---|---|
| N | IM | SP CSI-RS resource set ID 0 | | ... | SP CSI-RS resource set ID K | | TCI State ID 0 | ... | TCI State ID N |
| R | R | SP CSI-IM resource set ID 0 | | | SP CSI-IM resource set ID K | | | | |
| N | IM | | | | | | | | |
| R | R | | | | | | | | |
| R | | | | | | | | | |
| R | | | | | | | | | |

| R | Serving Cell ID | | | | | BWP ID | |
|---|---|---|---|---|---|---|---|
| S7 | S6 | S5 | S4 | S3 | S2 | S1 | S0 |
| S15 | S14 | S13 | S12 | S11 | S10 | S9 | S9 |

Fig. 6

RECEIVING CHANNEL STATE INFORMATION FROM A UE FOR MULTI-TRP OPERATION

BACKGROUND

A user equipment (UE) may establish a connection to at least one of multiple different networks or types of networks. Signaling between the UE and the network may be achieved via beamforming. Beamforming is an antenna technique used to transmit a directional signal which may be referred to as a beam.

The network may deploy multiple transmission reception points (TRPs) that are each configured to perform beamforming. To establish and maintain a beam between the UE and at least one of the TRPs, beam management techniques may be implemented on both the UE side and the network side. For example, the network may instruct the UE to collect channel state information (CSI) corresponding to one or more of the TRPs. The UE may report the CSI to the network where it may used to establish and/or maintain a beam between a TRP and the UE.

SUMMARY

Some exemplary embodiments are related to a baseband processor configured to perform operations. The operations include selecting a first transmission reception point (TRP) of multiple TRPs associated with a cell of a network, transmitting a signal to a user equipment (UE) via the selected TRP, wherein the signal is configured to trigger semi-persistent CSI (SP-CSI) report at the UE and receiving the SP-CSI report from the UE that includes CSI corresponding to each TRP of the multiple TRPs.

Other exemplary embodiments are related to a cell having a communication interface configured to communicate with a user equipment (UE) and a processor communicatively coupled with the communication interface and configured to perform operations. The operations include selecting a first transmission reception point (TRP) of multiple TRPs associated with a cell of a network, transmitting a signal to a user equipment (UE) via the selected TRP, wherein the signal is configured to trigger semi-persistent CSI (SP-CSI) report at the UE and receiving the SP-CSI report from the UE that includes CSI corresponding to each TRP of the multiple TRPs.

Still further exemplary embodiments are related to a method performed by a cell of a network. The method includes selecting a first transmission reception point (TRP) of multiple TRPs associated with a cell of a network, transmitting a signal to a user equipment (UE) via the selected TRP, wherein the signal is configured to trigger semi-persistent CSI (SP-CSI) report at the UE and receiving the SP-CSI report from the UE that includes CSI corresponding to each TRP of the multiple TRPs.

BRIEF DESCRIPTION OF THE DRAWINGS

FIG. 6 illustrates an example of a MAC CE that is configured to activate a SP-CSI report that includes CSI for multiples TRPs.

DETAILED DESCRIPTION

Figure 1:
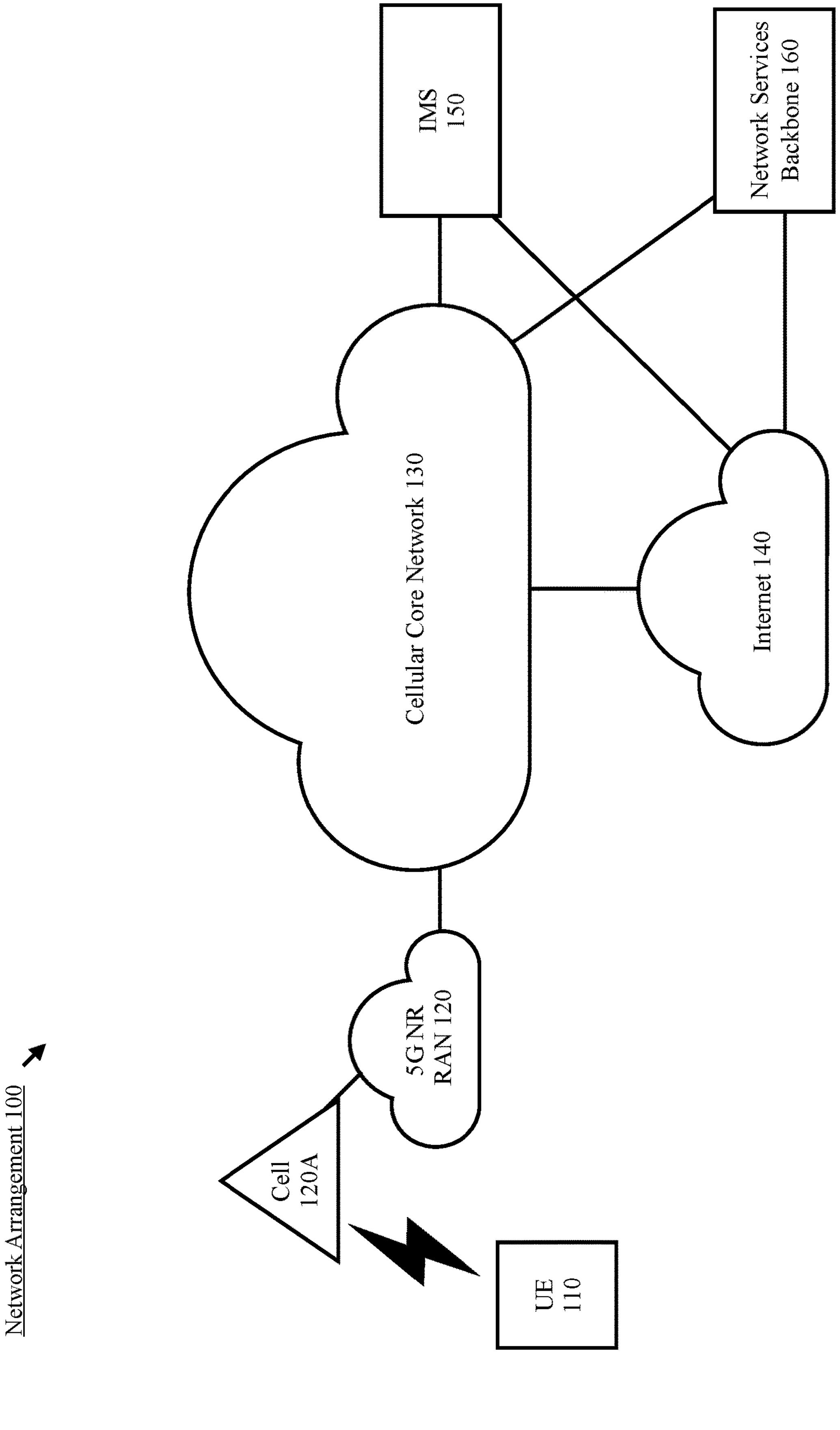
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to beam management for multi-transmission reception point (TRP) operation.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

The exemplary embodiments are also described with regard to a 5G New Radio (NR) network. However, reference to a 5G NR network is merely provided for illustrative purposes. The exemplary embodiments may be utilized with any network that utilizes beamforming. Therefore, the 5G NR network as described herein may represent any type of network that implements beamforming.

A person of ordinary skill in the art would understand that beamforming is an antenna technique that is utilized to transmit or receive a directional signal. From the perspective of a transmitting device, beamforming may refer to propagating a directional signal. Throughout this description, a beamformed signal may be referred to as a "beam" or a "transmitter beam." The transmitter beam may be generated by having a plurality of antenna elements radiate the same signal. Increasing the number of antenna elements radiating the signal decreases the width of the radiation pattern and increases the gain. Thus, a transmitter beam may vary in width and be propagated in any of a plurality of different directions.

From the perspective of a receiving device, beamforming may refer to tuning a receiver to listen to a direction of interest. Throughout this description, the spatial area encompassed by the receiver listening in the direction of interest may be referred to as a "beam" or a "receiver beam." The receiver beam may be generated by configuring the parameters of a spatial filter on a receiver antenna array to listen in a direction of interest and filter out any noise from outside the direction of interest. Like a transmitter beam, a receiver beam may also vary in width and be directed in any of a plurality of different areas of interest.

In addition, the exemplary embodiments are described with regard to a next generation node B (gNB) that is configured with multiple TRPs. Throughout this description, a TRP generally refers to a set of components configured to transmit and/or receive a beam. The examples provided below will be described with regard to a deployment scenario in which multiple TRPs are deployed at various different locations and connected to the gNB via a backhaul connection. For example, multiple small cells may be deployed at different locations and connected to the gNB.

However, those skilled in the art will understand that TRPs are configured to be adaptable to a wide variety of different conditions and deployment scenarios. Thus, any reference to a TRP being a particular network component or multiple TRPs being deployed in a particular arrangement is merely provided for illustrative purposes. The TRPs described herein may represent any type of network component configured to transmit and/or receive a beam.

The exemplary embodiments relate to implementing beam management techniques on both the UE side and the network side. Beam management generally refers to a set of procedures configured for acquiring and maintaining a beam between a TRP and the UE. In one aspect, the exemplary embodiments relate to the UE collecting and reporting channel state information (CSI) corresponding to multiple TRPs. Examples of how the network may activate/deactivate the collection of CSI corresponding to a particular TRP and how the UE may report CSI for multiple TRPs will be provided in detail below. Other aspects of the exemplary embodiments include configuring one of the multiple TRPs as a special cell for the UE, the UE providing capability information to the network related to demodulation and channel estimation capabilities and introducing physical cell identity (PCI) into certain types of radio resource control (RRC) configuration information. Specific examples of each of these aspects will be provided in detail below. The exemplary beam management techniques described herein may be used in conjunction with currently implemented beam management mechanisms, future implementations of beam management mechanisms or independently from other beam management mechanisms.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a cell 120A that represents a gNB that is configured with multiple TRPs. Each TRP may represent one or more components configured to transmit and/or receive a beam. To provide an example, multiple small cells may be deployed at different locations and connected to the gNB. In some embodiments, multiple TRPs may be deployed locally at the cell 120A. In other embodiments, multiple TRPs may be distributed at different locations and connected to the gNB.

Figure 2:
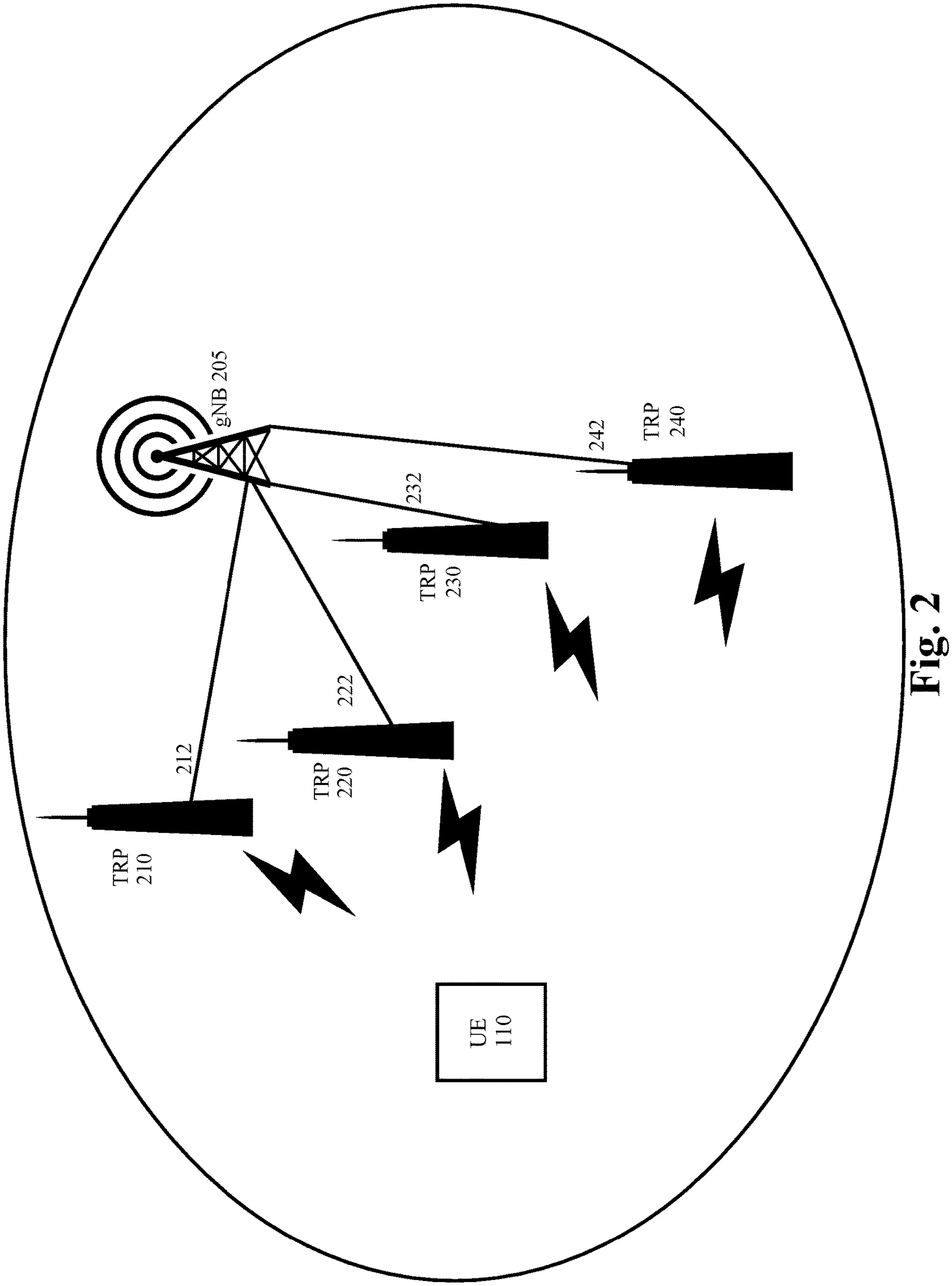
FIG. 2 shows an example of multiple transmission reception points (TRPs) deployed at different locations.

FIG. 2 shows an example of multiple TRPs deployed at different locations. In this example, the gNB 205 is configured with a first TRP 210 via a backhaul connection 212, a second TRP 220 via backhaul connection 222, a third TRP 230 via a backhaul connection 332 and a fourth TRP 240 via backhaul connection 242. Each of the TRPs 210-240 may transmit a beam to and/or receive a beam from the UE 110. However, the gNB 205 may be configured to control the TRPs 210-240 and perform operations such as, but not limited to, assigning resources, activating/deactivating CSI reference signals corresponding to a particular TRP, activating/deactivating CSI reporting for a particular TRP, configuring a TRP as a special cell for the UE 110, implementing beam management techniques, etc.

The example shown in FIG. 2 is not intended to limit the exemplary embodiments in any way. Those skilled in the art will understand that 5G NR TRPs are adaptable to a wide variety of different conditions and deployment scenarios. An actual network arrangement may include any number of different types of cells and/or TRPs being deployed by any number of RANs in any appropriate arrangement. Thus, the example of a single cell 120A in FIG. 1 and a single gNB 205 with four TRPs 210-240 in FIG. 2 is merely provided for illustrative purposes.

Returning to the network arrangement 100 of FIG. 1, the cell 120A may include one or more communication interfaces to exchange data and/or information with UEs, the corresponding RAN 120, the cellular core network 130, the internet 140, etc. Further, the cell 120A may include a processor configured to perform various operations. For example, the processor of the cell 120A may be configured to perform operations related to access barring. However, reference to a processor is merely for illustrative purposes. The operations of the cell 120A may also be represented as a separate incorporated component of the cell 120A or may be a modular component coupled to the cell 120A, e.g., an integrated circuit with or without firmware. For example, the integrated circuit may include input circuitry to receive signals and processing circuitry to process the signals and other information. In addition, in some examples, the functionality of the processor is split among two or more processors such as a baseband processor and an applications processor. The exemplary embodiments may be implemented in any of these or other configurations of a cell.

The UE 110 may connect to the 5G NR-RAN 120 via the cell 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cell 120A). However, as mentioned above, reference to the 5G NR-RAN 120 is merely for illustrative purposes and any appropriate type of RAN may be used.

In addition to the 5G NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 3:
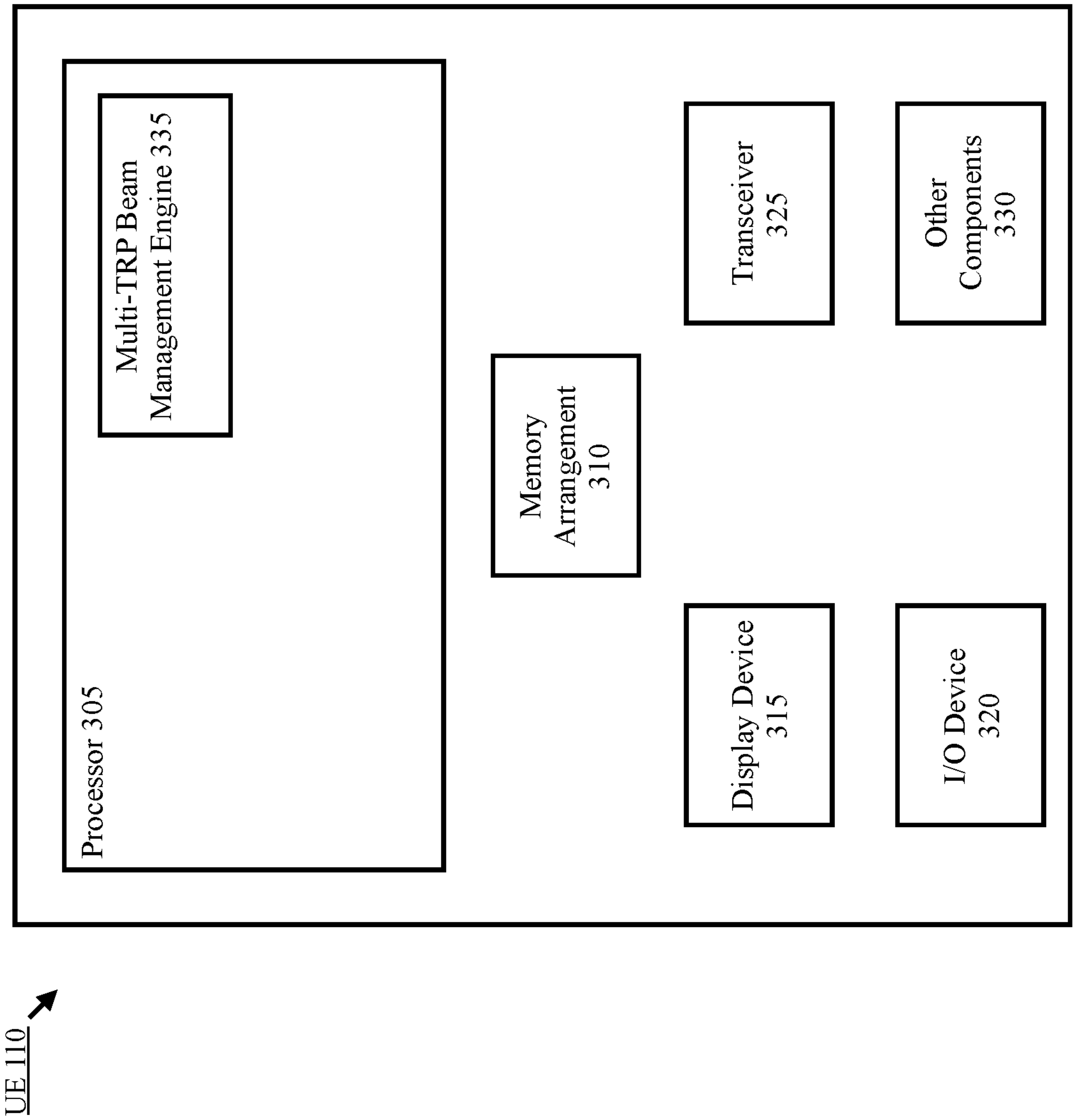
FIG. 3 shows an exemplary user equipment (UE) according to various exemplary embodiments.

FIG. 3 shows an exemplary UE 110 according to various exemplary embodiments. The UE 110 will be described with regard to the network arrangement 100 of FIG. 1. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include a multi-TRP beam management engine 335. The multi-TRP beam management engine 335 may be configured to perform operations related to beam management such as, monitoring for CSI reference signals from one or more TRPs, reporting CSI information for one or more TRPs, etc.

The above referenced engine 335 being an application (e.g., a program) executed by the processor 305 is only exemplary. The functionality associated with the engine 335 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine 335 may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, an LTE-RAN (not pictured), a legacy RAN (not pictured), a WLAN (not pictured), etc. Accordingly, the transceiver 325 may operate on a variety of different frequencies or channels (e.g., set of consecutive frequencies).

Figure 4:
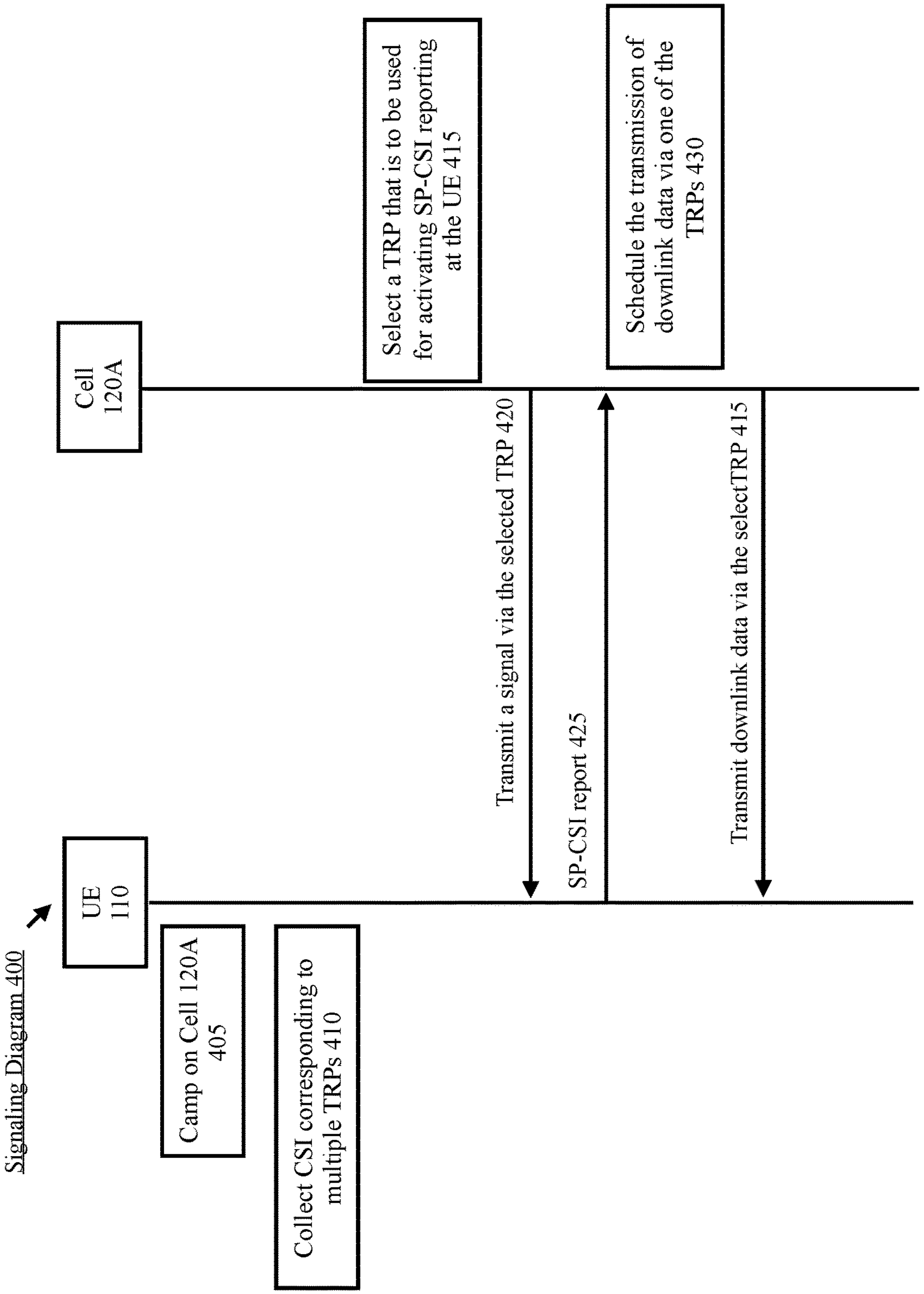
FIG. 4 shows a signaling diagram for semi-persistent channel state information (SP-CSI) reporting for multi-TRP operation according to various exemplary embodiments.

FIG. 4 shows a signaling diagram 400 for semi-persistent channel state information (SP-CSI) reporting for multi-TRP operation according to various exemplary embodiments. The signaling diagram 400 will be described with regard to the network arrangement 100 of FIG. 1, the example shown in FIG. 2 and the UE 110 of FIG. 3. The signaling diagram 400 includes the UE 110 and the cell 120A.

In 405, the UE 110 camps on the cell 120A. For example, consider the scenario depicted in FIG. 2, the UE 110 may camp on the gNB 205.

In 410, the UE 110 collects CSI corresponding to multiple TRPs. For example, when camped on the cell 120A, the UE 110 may monitor for CSI reference signals (CSI-RS), synchronization signal blocks (SSBs) or any other type of information transmitted by a TRP that may be used to derive CSI corresponding to the TRP. Thus, within the context of the example shown in FIG. 2, the UE 110 may receive CSI-RS or SSB from each of the TRPs 210-240. Those skilled in the art will understand that CSI may include information such as, but not limited to, channel quality information (CQI), reference signal received power (RSRP) and/or any other type of information that indicate the channel properties between the UE 110 and another endpoint.

In some embodiments, the UE 110 may be configured to collect CSI corresponding to TRPs identified in a medium access control (MAC) control element (CE). For example, while camped on the cell 120A, the UE 110 may receive a MAC CE that is configured to activate more than one SP-non-zero power (NZP)—CSI-RS simultaneously.

Figure 5:
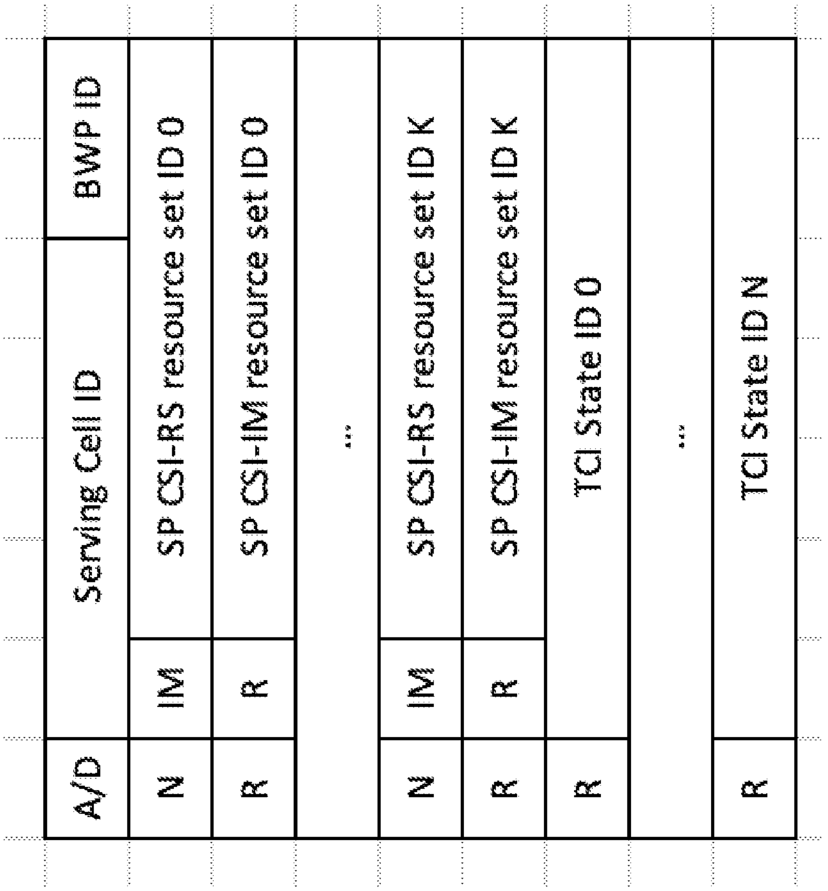
FIG. 5 illustrates an example of a medium access control (MAC) control element (CE) that is configured to activate more than one semi-persistent non-zero-power channel state information reference signal (SP-NZP-CSI-RS) simultaneously.

FIG. 5 illustrates an example of a MAC CE that is configured to activate more than one SP-NZP-CSI-RS simultaneously. In this example, the A/D field indicates whether the MAC CE is activating or deactivating the corresponding more than one SP-NZP-CSI-RS. The serving cell ID field may include a serving cell index (e.g. 5 bit or any other appropriate type). The bandwidth part (BWP) ID field may include a BWP index, (e.g., 2 bit or any other appropriate type). The SP-CSI-RS resource set ID field identifies a particular SP-CSI-RS resource set. The N fields may indicate whether there is another SP-CSI-RS resource set following. The interference measurement (IM) fields may indicate whether there is another SP-CSI-RS-IM resource set following. The SP-CSI-IM resource set ID field identifies a particular SP-CSI-IM resource set. The R field may represent a reserved bit. The transmission configuration indicator (TCI) state ID field indicates the TCI state configuration for the SP-CSI-RS resources in the order they are activated.

Returning to FIG. 4, in 415, the cell 120A selects a TRP that is to be used for activating a SP-CSI reporting at the UE 110. In some embodiments, the cell 120A may select the TRP based on the location of the UE 110. For example, when camped on the gNB 205, the UE 110 may report CSI to the gNB 120A that corresponds to the interface between the UE 110 and the gNB 120A. The gNB 205 may use the CSI, UE uplink sounding, or other means to determine a location of the UE 110 relative to the gNB 205 and/or its TRPs 210-240. The gNB 205 may then select one or more TRPs based on the location of the UE 110. However, the exemplary embodiments are not limited to performing this selection on the basis of the location of the UE 110. The gNB 205 may also consider other factors such as, but not limited to, obstructions in the line of sight between the UE 110 and a TRP, network load, UE 110 mobility, interference, etc.

In 420, the cell 120A transmits a signal to the UE 110 via the selected TRP. The signal may be configured to trigger the UE 110 to provide a SP-CSI report to the network.

In some embodiments, the SP-CSI report may be activated via a MAC CE. FIG. 6 illustrates an example of a MAC CE that is configured to activate one or more SP-CSI report that includes CSI for multiples TRPs. The serving cell ID field may include a serving cell index (e.g. 5 bit or any other appropriate type). The BWP ID field may include a BWP index, (e.g., 2 bit or any other appropriate type). The R field may represent a reserved bit. Each S field may (e.g. Si) indicates whether a SP-CSI corresponding to a particular TRP is activated. For example, if Si is 1, the corresponding SP-CSI is activated. If Si is 0, the corresponding SP-CSI is deactivated. Si corresponds to the i-th configured SP-CSI in the increasing order of corresponding CSI-ReportConfigID. In addition, there may be an A/D field (not pictured) that indicates whether the MAC CE is activating or deactivating the corresponding SP-CSI.

In other embodiments, downlink control information (DCI) may be used for activation or deactivation of SP-CSI. Thus, SP-CSI for multiple TRPs may be activated or deactivated with the same instance of DCI.

In one example, radio resource control (RRC) signaling may configure a SP-CSI trigger state codepoint for each SP-CSI trigger state codepoint may contain more than one SP-CSI trigger state (e.g., one for each TRP). In the CSI request field of the DCI, the SP-CSI trigger states in the corresponding SP-CSI trigger state codepoint are activated or deactivated.

In another example, the CSI request field in the DCI may be designed based on a bitmap. When (N) SP-CSI reports are configured, the CSI request field is bitmap with (N) bits. Each bit may represent whether the corresponding SP-CSI is activated or deactivated.

In another example, the CSI request bitwidth may be increased (M) times in order to activate or deactivate up to (M) SP-CSI. Here, (M) segments of ceiling (log 2 (N+1) bits field for CSI request may be configured where (N) is the number of configured SP-CSI reports. This example may also include a reserved bit sequence that is defined to indicate that no SP-CSI is triggered for the particular segment.

In 425, the UE 110 transmits the SP-CSI report to the cell 120A in response to the signal. In some embodiments, the SP-CSI report may be provided via the interface between the UE 110 and the gNB 205. In other embodiments, the SP-CSI report may be provided indirectly to the gNB 120A via one of the TRPs.

The SP-CSI report may contain CSI corresponding to TRP that transmitted the signal in 420. In addition, the SP-CSI report may contain CSI corresponding to multiple other TRPs. For instance, within the context of the example depicted in FIG. 2, consider a scenario in which TRP 210 transmitted the trigger signal in 420. The subsequent SP-CSI report may include CSI corresponding to the TRP 210. In addition, the SP-CSI report may also include CSI corresponding to the TRP 220, CSI corresponding to the TRP 230 and/or CSI corresponding to the TRP 240. Thus, the UE 110 may configure the SP-CSI report to include CSI corresponding to multiple TRPs. The example provided above describes CSI reporting corresponding to four different TRPs in the same SP-CSI report. However, the exemplary embodiments are not limited to a SP-CSI report corresponding to four different TRPs. The SP-CSI report described herein may be configured to include CSI corresponding to any appropriate number of TRPs (e.g., 4 or more TRPs).

In 430, the cell 120A may schedule the transmission of downlink data to the UE 110 via one of the multiple TRPs. The cell 120A may select a particular TRP to perform the transmission of the downlink data based on the SP-CSI report. Thus, in some scenario, the UE 110 may receive the SP-CSI report activation trigger from a first TRP and receive subsequent downlink data from a second different TRP. In 435, the cell 120A transmits downlink data to the UE 110 via the selected TRP.

As indicated above, in some embodiments, MAC CEs may be used to activate SP-CSI-RS or a SP-CSI report. Thus, although not shown in the signaling diagram 400, after the transmission of the downlink data, the cell 120A may transmit a second MAC CE that deactivates the trigger state activated by the previous MAC CE. In other embodiments, DCI may be used to activate SP-CSI. Thus, although not shown in the signaling diagram 400, after the transmission of the downlink data, the cell 120A may transmit a second instance of DCI that deactivates the trigger state activated by the previous DCI.

For either of the MAC CEs described above, they may be further configured to activate SP-CSI or SP-CSI-RS in more than one component carrier (CC) and/or more than one BWP with the CC. For example, a CC list may be configured. The CC list may be orthogonal (e.g., a single CC or BWP cannot belong to two different lists) or may be non-orthogonal. When the serving cell ID or BWP ID is indicated by the MAC CE, all the CCs that share the same CC list as the indicated serving cell ID has the indicated SP-CSI-RS resource and/or SP-CSI activated or deactivated. In the indicated CC, al the BWPs that share the same BWP list as the indicated BWP ID has the indicated SP-CSI-RS resource and/or SP-CSI activated or deactivated.

As mentioned above, another aspect of the exemplary embodiments related to configuring one or more TRPs as a special cell. For instance, consider the example described with regard to the signaling diagram 400. In this scenario, the TRP that is configured to provide the downlink data to the UE 110 in 435 may be considered the serving cell. One or more of the other TRPs with activated SP-CSI may be configured as a special cell to that serving cell.

For each serving cell, more than one downlink cells may be configured. As indicated above, each downlink cell corresponds to one TRP. The network may configure each downlink cell independently. In some embodiments, a MAC CE may be used to activate or deactivate the downlink cell. In other embodiments, the downlink cell may be transition in or out of dormancy mode using DCI (e.g., DCI format 2_6 or any other appropriate type of DCI.

In addition, each downlink cell associated with the serving cell may be configured with its own CORESET (e.g., a different CORESETPoolIndex). In some embodiments, the total number of CORESETs per downlink cell may be less than or equal to 3. For each serving cell, if (N) downlink cells are configured, the maximum number of configured CORESETs across all downlink cells are contained to be a value less than 3 (N). Further, in this example, the maximum total number of configured search spaces across all downlink cells may be less than or equal to 10. One of the downlink serving cells may be configured to perform cross carrier scheduling while the other downlink cells may perform self-scheduling.

In another aspect, to facilitate demodulation and channel estimation, the UE 110 may indicate the following capabilities to the network for physical downlink shared channel (PDSCH) scheduled from multiple TRPs overlapping in the frequency domain. In response, the network may configure the multi-TRP operation to accommodate the capabilities indicated by the UE 110.

In one example, the UE 110 may indicate that all PDSCH scheduled should have the same precoding resource block group (PRG) size (e.g., 2 precoding resource block (PRB), 4PRB, wideband, etc.). In another example, the UE 110 may indicate that all PDSCH scheduled should have the same virtual resource block (VRB) to PRB interleaving. In another example, in the same DCI that schedules a PDSCH, aperiodic (AP)-zero power (ZP)-CSI-RS is also triggered for rate matching. The UE 110 may indicate that for all scheduled PDSCHs overlapping with PDSCH in the frequency domain, the UE 110 is to perform the same AP-ZP-CSI-RS rate matching among all TRPs.

In another aspect, PCI (or any other appropriate type of logic index) may be introduced in the following types of RRC configuration information: quasi-co-location information (QCL-info), sounding reference signal spatial relation information (SPS-SpatialRelationInfo), physical uplink control channel (PUCCH) spatial relation information (PUCCH-SpatialRelationInfo), PUCCH pathloss reference reference signal (PUCCH-PathlossReferenceRS), physical uplink shared channel (PUSCH) pathloss reference reference signal (PUSCH-PathlossReferenceRS) and pathloss-ReferenceRS under SRS-resource set. In the Rel-15 and Rel-16 NR specification PCI is not allowed to be configured for the reference signal used as the QCL configuration for either the downlink TCI indication or the uplink spatial relation indication because Rel-15 and Rel-16 NR only support intra-cell multi-TRP operation. For inter-cell multi-TRP, TRPs may belong to different cells and thus, correspond to different PCI. Introducing PCI in the type of RRC configuration described above may allow the network to configure the reference signal in the other TRP for multiple purposes such as, but not limited to, beam indication, reference signal configuration, CSI configuration, etc.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A baseband processor configured to perform operations comprising:

selecting a first transmission reception point (TRP) of multiple TRPs associated with a cell of a network;

transmitting first radio resource control (RRC) configuration information to a user equipment (UE) comprising quasi-co location information (QCL-info) and a first physical cell identity (PCI);

transmitting second RRC configuration information to the UE comprising physical uplink control channel (PUCCH) pathloss reference signal (PUCCH-Pathloss-ReferenceRS) and a second PCI;

transmitting third RRC configuration information to the UE comprising physical uplink shared channel (PUSCH) pathloss reference signal (PUSCH-Pathloss-ReferenceRS) and a third PCI;

transmitting a signal to the UE via the selected TRP, wherein the signal is configured to trigger semi-persistent channel state information (SP-CSI) report at the UE; and receiving the SP-CSI report from the UE that includes channel state information (CSI) corresponding to each TRP of the multiple TRPs.

2. The baseband processor of claim 1, further comprising:

transmitting, a medium access control (MAC) control element (CE) that is configured to activate multiple SP-CSI reference signals (SP-CSI-RS) at the UE, wherein each SP-CSI-RS corresponds to a respective one of the multiple TRPs.

3. The baseband processor of claim 2, wherein the MAC CE is configured to include at least one of an activation/deactivation field, a serving cell ID field, a bandwidth part (BWP) ID field, multiple transmission configuration indicator (TCI) state IDs, multiple SP-CSI-RS resource set IDs and multiple SP-CSI interference measurement (SP-CSI-IM) resource set IDs.

4. The baseband processor of claim 3, wherein the MAC CE is configured to activate Sp-CSI-RS in more than one component carrier (CC) or more than one bandwidth part (BWP).

5. The baseband processor of claim 1, wherein the signal configured to trigger the SP-CSI report is a medium access control (MAC) control element (CE) and wherein the MAC CE includes at least one of a serving cell ID field, a bandwidth part (BWP) ID field and an indication of whether SP-CSI is activated in each of the multiple TRPs.

6. The baseband processor of claim 5, wherein the MAC CE is configured to activate SP-CSI-RS in more than one component carrier (CC) or more than one bandwidth part (BWP).

7. The baseband processor of claim 1, wherein the signal configured to trigger the SP-CSI report is downlink control information (DCI).

8. The baseband processor of claim 7, wherein the DCI includes a CSI request field that is based on a bitmap.

9. The baseband processor of claim 1, the operations further comprising:

scheduling the transmission of downlink data from a second TRP that is different than the first TRP in response to the measurement report; and configuring one or more of the multiple TRPs as a special cell to the second TRP.

10. The baseband processor of claim 9, wherein each of the one or more of the multiple TRPs is configured with a different CORESETPoolIndex.

11. The baseband processor of claim 1, wherein the first TRP of the multiple TRPs is configured with the first physical cell ID (PCI).

12. A cell, comprising:

a communication interface configured to communicate with a user equipment (UE); and a processor communicatively coupled with the communication interface and configured to perform operations, the operations comprising:

selecting a first transmission reception point (TRP) of multiple TRPs associated with a cell of a network;

transmitting first radio resource control (RRC) configuration information to a user equipment (UE) comprising quasi-co location information (QCL-info) and a first physical cell identity (PCI);

transmitting second RRC configuration information to the UE comprising physical uplink control channel (PUCCH) pathloss reference signal (PUCCH-PathlossReferenceRS) and a second PCI;

transmitting third RRC configuration information to the UE comprising physical uplink shared channel (PUSCH) Pathloss reference signal (PUSCH-PathlossReferenceRS) and a third PCI;

transmitting a signal to the UE via the selected TRP, wherein the signal is configured to trigger semi-persistent channel state information (SP-CSI) report at the UE; and receiving the SP-CSI report from the UE that includes channel state information (CSI) corresponding to each TRP of the multiple TRPs.

13. The cell of claim 12, wherein the signal configured to trigger the SP-CSI is downlink control information (DCI).

14. The cell of claim 13, the operations further comprising:

transmitting a radio resource control (RRC) message to the UE, wherein the RRC message configures a SP-CSI trigger state codepoint that includes multiple SP-CSI trigger states, and wherein a CSI request field in the DCI activates all of the multiple SP-CSI trigger states in the same SP-CSI trigger state codepoint.

15. The cell of claim 13, wherein the DCI includes a CSI request bitwidth that is increased to activate SP-CSI for the multiple TRPs.

16. A method, comprising:

at a cell of a network;

selecting a first transmission reception point (TRP) of multiple TRPs associated with a cell of a network;

transmitting first radio resource control (RRC) configuration information to a user equipment (UE) comprising quasi-co location information (QCL-info) and a first physical cell identity (PCI);

transmitting second RRC configuration information to the UE comprising physical uplink control channel (PUCCH) pathloss reference signal (PUCCH-PathlossReferenceRS) and a second PCI;

transmitting third RRC configuration information to the UE comprising physical uplink shared channel (PUSCH) pathloss reference signal (PUSCH-PathlossReferenceRS) and a third PCI;

transmitting a signal to the via the selected TRP, wherein the signal is configured to trigger semi-persistent channel state information (SP-CSI) report at the UE; and receiving the SP-CSI report from the UE that includes channel state information (CSI) corresponding to each TRP of the multiple TRPs.

17. The method of claim 16, wherein the multiple TRPs is a set of TRPs that includes at least the first TRP, a second TRP, a third TRP and a fourth TRP.

18. The method of claim 16, further comprising:

scheduling the transmission of downlink data from a second TRP that is different than the first TRP in response to the measurement report.

19. The method of claim 16, wherein the PUCCH-PathlossReferenceRS is under sounding reference signal (SRS) resource set.

* * * * *